INVENTOR
DAVID W. PRINE.
ATTORNEYS.

United States Patent Office 3,549,986
Patented Dec. 22, 1970

3,549,986
MICROWAVE FLAW DETECTION SYSTEM HAVING HORNS POSITIONED WITH THEIR POLARIZATION DIRECTIONS TRANSVERSE TO EACH OTHER
David W. Prine, Maywood, Ill., assignor to Magnaflux Corporation, Chicago, Ill., a corporation of Delaware
Filed Apr. 10, 1967, Ser. No. 629,540
Int. Cl. G01r 27/04
U.S. Cl. 324—58.5                                6 Claims

ABSTRACT OF THE DISCLOSURE

System using microwaves for detection of flaws in a sample, one form of sample being a vehicle tire. The system uses a detection means which is insensitive to energy transmitted directly from a transmitting antenna and energy reflected from surfaces of the sample, but which is highly sensitive to energy scattered by flaws within the sample. Preferably, the transmitting and receiving antenna, which may be in the form of horns, are positioned with their polarization directions generally transverse to each other.

---

Figure 1:
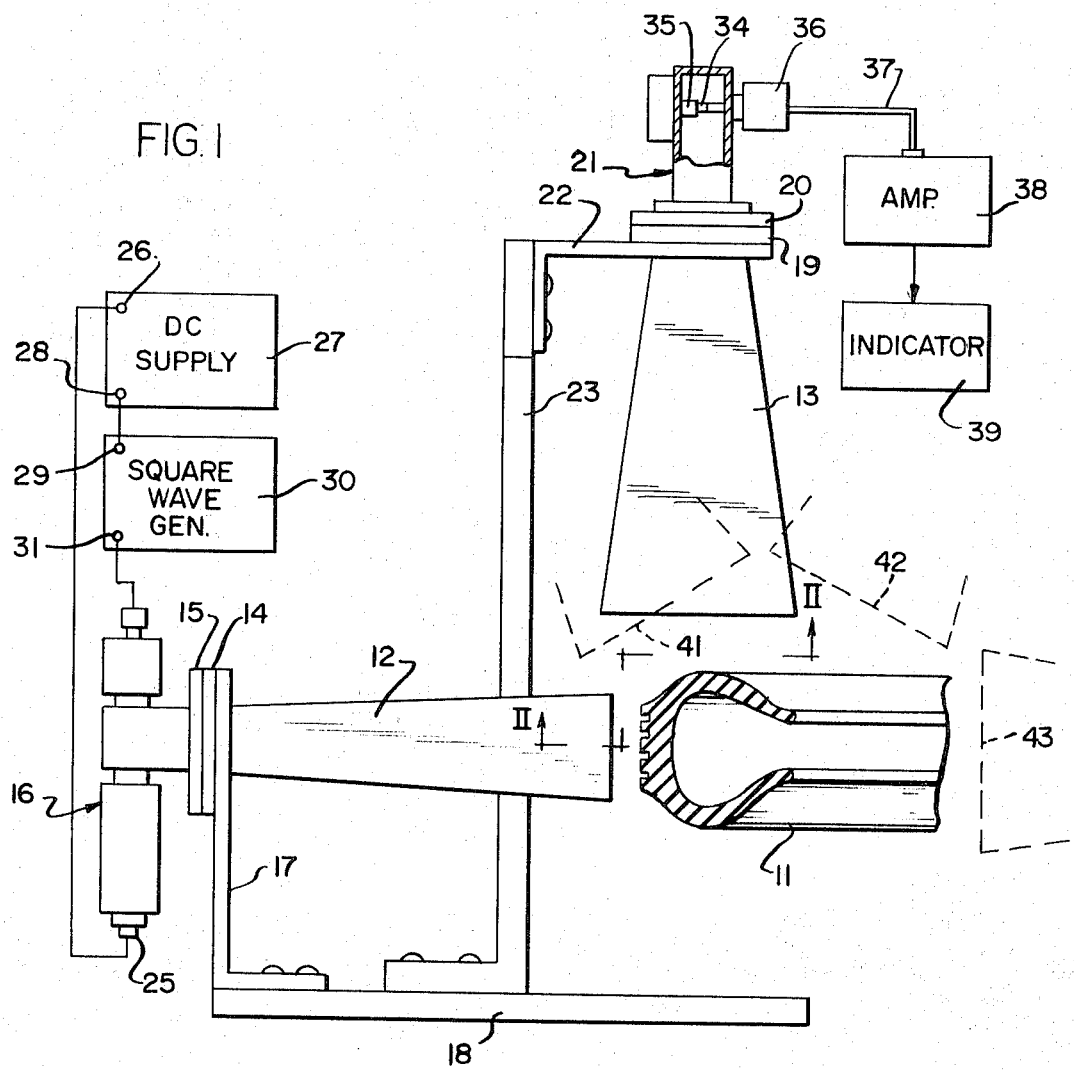

This invention relates to a microwave flaw detection system and more particularly to a system which is highly reliable and effective and which is highly sensitive to inhomogeneities within a sample while being insensitive to variations in the characteristics and configuration of the sample.

Microwave energy has heretofore been used in nondestructive applications, usually with the microwave energy being passed through a sample and with the reduction on the energy passed through the sample being detected to indicate flaws within the sample. Although such systems have been useful in some applications, their use has been limited in that characteristics of the sample and variations in its configuration and positioning have affected the output indication and have made it difficult to reliably detect flaws.

This invention was evolved with the general object of overcoming the disadvantage of prior systems and of providing a system which is highly sensitive to inhomogeneities in a sample while being insensitive to variations in the characteristics, positioning and configuration of the sample.

According to this invention, a system is provided which includes transmission means for transmitting microwave energy into a sample to produce scattering of the microwave energy by inhomogeneities, with detection means being provided for detecting the microwave energy scattered by the inhomogeneities.

In accordance with an important feature of the invention, the detection means is so oriented relative to the sample and to the transmission means as to be insensitive to energy transmitted directly from the transmission means.

In accordance with a specific feature of the invention, transmitting and receiving antennas are provided each having a direction of polarization with the direction of polarization of the receiving antenna being transverse to the direction of polarization of the transmitting antenna. With this arrangement, the sensitivity to direct radiation is minimized and at the same time, it is found that the sensitivity to flaws is very high, in that the flaws apparently produce energy polarized in all directions.

Preferably, and in accordance with a further specific feature of the invention, the antennas are in the form of guides, most preferably horns, having rectangular mouths with long and short dimensions, the short dimension of the receiving guide mouth being transverse to the short dimension of the transmitting guide mouth.

To further minimize detection of directly transmitted energy, the energy is preferably transmitted in a beam and the receiving antenna is preferably located outside the transmitted beam path.

In accordance with still another feature, the receiving antenna may be so located as not to respond to energy reflected from a surface of the sample.

The invention is particularly advantageous in the testing of bodies of substantially solid material, the maximum effectiveness being obtained with bodies of nonconductive or nonmetallic materials. Considerable success has been achieved in the testing of bodies of irregular shape, such as vehicle tires, by way of example. Air bubbles, metallic inclusions, delaminations and other flaws can be readily detected. It should be understood, however, that the invention is not necessarily limited to the detection of characteristics of a sample which are considered undesirable, but can be used in detection of any form of inhomogeneity, such as changes in moisture content or constituents of a sample, which might produce scattered radiation.

Figure 2:
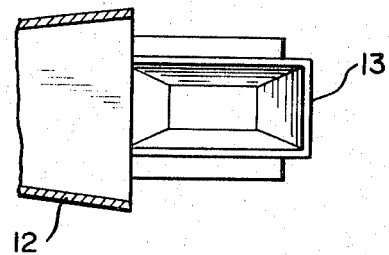

This invention contemplates other and more specific objects, features and advantages which will become more fully apparent from the following detailed description taken in conjunction with the accompanying drawings which illustrate a preferred embodiment and in which:

FIG. 1 is an elevational view, partly diagrammatic, illustrating a microwave flaw detection system constructed in accordance with the principles of this invention, in use in inspecting a vehicle tire; and FIG. 2 is a cross-sectional view taken substantially along line II—II of FIG. 1.

Reference numeral 10 generally designates a microwave testing system constructed in accordance with the principles of this invention. The system 10 is illustrated in use in testing an automobile tire 11, and can readily detect air bubbles, metallic inclusions, delaminations and other flaws in tires. It will be understood, however, that the invention is not limited to the testing of tires and may be used in the testing of a wide variety of samples of various compositions, shapes and sizes. An important advantage of the system is that it can test samples of irregular shape and it is not sensitive to variations in the exact positioning of the sample. For example, in the case of testing of tires, the tire is rotated to scan the entire tire for flaws, and variations in positioning, due to out-of-roundness of the tire, produce a negligible signal while signals due to internal flaws are easily observed.

The illustrated system 10 comprises a transmitting antenna in the form of a horn 12 operative to transmit energy into a portion of the tire 11 and a receiving antenna in the form of a horn 13 which receives energy scattered by flaws within the tire 11. The transmitting horn 12 has a flange 14 secured to a flange 15 of a klystron oscillator 16 and also to a bracket 17 mounted on a fixed support 18. Similarly, the receiving horn 13 has a flange 19 secured to a flange 20 of a detector unit 21 and also secured to a bracket 22 on an upright member 23 carried by the fixed support 18. The klystron oscillator 16 has one terminal 25 secured to one terminal 26 of a DC supply 27 with a second terminal 28 of the supply 27 being connected to one terminal 29 of a squarewave generator 30 which may be operated at a relatively low frequency on the order of 1 kHz. The other terminal 31 of the squarewave generator 30 is connected to a second terminal 32 of the klystron oscillator 16. Thus the microwave energy is modulated at a relatively low frequency rate.

The detector unit 21 comprises a detector diode 34 which is mounted on the end of a probe 35 to demodulate the received energy and to develop a low frequency signal which is coupled through a fitting 36 and a line 37 to the input of an amplifier 38 having an output connected to an indicator 39.

An important feature of the invention is in the positioning of the receiving or detecting means in a manner such that it is insensitive to energy transmitted directly from the transmission means, while being sensitive to scattered energy. In accordance with one aspect of this feature, a cross-polarization arrangement is provided in which the direction of polarization of the receiving antenna is transverse to the direction of polarization of the transmitting antenna. In the illustrated system, the transmitting horn 12 and the receiving horn 13 both have rectangular mouths with short and long dimensions, and with the short dimension of each mouth being transverse to the short dimension of the other. Thus as illustrated in FIGS. 1 and 2, the short dimension of the transmitting horn 12 is parallel to the plane of the paper in FIG. 1 and transverse to the plane of the paper in FIG. 2, while the opposite is true with respect to the receiving horn 13. The direction of polarization is in the direction of the short dimension in each case and with this arrangement, the directions of polarization are transverse to each other.

In accordance with another aspect, the receiving horn 13 is located outside the path of energy transmitted from the transmitting horn 12, to minimize the detection of energy transmitted directly from the transmitting horn. Further, the axis of the receiving horn 13 is at right angles to the axis of the transmitting horn 12. This arrangement is generally preferred, but it should be noted that it is not always essential. For example, the receiving horn 13 could be located with its end position as indicated by dotted line 41, with its axis at an acute angle to that of the transmitting horn 12, or it may be positioned as indicated by dotted line 42 with its axis at an obtuse angle relative to the axis of the transmitting horn 12. It is also possible to locate the receiving horn 13 directly opposite the transmitting horn 12, as indicated by dotted line 43 and to obtain a high degree of sensitivity to scattered energy, provided that the directions of polarization of the horns are maintained in transverse relation. Generally, however, the illustrated arrangement is preferred, with the axes of the two horns being at right angles to each other.

With further regard to the relative positioning of the transmitting and receiving horns, it is desirable that the horns be so located relative to surfaces of the object under test that there is no direct reflection of energy from the surface of the object into the receiving antenna or horn.

I claim as my invention:

1. In a system for detecting inhomogeneities in a sample, transmission means for transmitting microwave energy into the sample to produce scattering of the microwave energy by inhomogeneities within the sample, and detecting means for detecting the microwave energy scattered by the inhomogeneities, said transmission and detection means respectively including a transmitting antenna and a receiving antenna each having a direction of polarization with the direction of polarization of said receiving antenna being transverse to the direction of polarization of said transmitting antenna.

2. In a system as defined in claim 1, said antennas being in the form of guides having rectangular mouths with long and short dimensions, the short dimension of the receiving guide mouth being transverse to the short dimension of the transmitting guide mouth.

3. In a system as defined in claim 2, said guides being in the form of horns.

4. In a system as defined in claim 1, said transmission means being arranged to transmit energy in a certain path, and said receiving antenna being located outside said path.

5. In a system as defined in claim 1, said receiving antenna being so located as to be substantially insensitive to energy reflected from a surface of said sample.

6. In a system as defined in claim 1, said transmission means including means for modulating said microwave energy at a low frequency rate, and said detection means including means for demodulating the receiving scattered energy to produce a low frequency signal, and means for amplifying said low frequency signal.

References Cited

UNITED STATES PATENTS

| | | | |
|---|---|---|---|
| 2,797,388 | 6/1957 | Maybury et al. | 324—58.5(A) |
| 3,117,276 | 1/1964 | Beyer et al. | 324—58.5(B) |
| 3,133,246 | 5/1964 | Jaffee et al. | 324—58.5(B) |
| 3,233,172 | 2/1966 | Luoma | 324—58(B) |

OTHER REFERENCES

Wheeler: Introduction to Microwaves, Prentice-Hall Inc. (1963), p. 115.

EDWARD E. KUBASIEWICZ, Primary Examiner